(12) United States Patent
Oxley

(10) Patent No.: US 7,688,263 B1
(45) Date of Patent: Mar. 30, 2010

(54) VOLUMETRIC DIRECTION-FINDING SYSTEM USING A LUNEBERG LENS

(76) Inventor: Roger Dale Oxley, 15220 Turkey Foot Rd., Darnestown, MD (US) 20878

( * ) Notice: Subject to any disclaimer, the term of this patent is extended or adjusted under 35 U.S.C. 154(b) by 43 days.

(21) Appl. No.: 12/329,634

(22) Filed: Dec. 7, 2008

(51) Int. Cl.
G01S 5/04 (2006.01)
G01S 13/00 (2006.01)

(52) U.S. Cl. .......................... 342/447; 342/56; 342/57

(58) Field of Classification Search ............. 342/447, 342/56, 57
See application file for complete search history.

(56) References Cited

U.S. PATENT DOCUMENTS

| | | | |
|---|---|---|---|
| 4,314,249 A * | 2/1982 | Onoe | 342/6 |
| 4,857,937 A * | 8/1989 | Dadds | 342/377 |
| 5,047,776 A * | 9/1991 | Baller | 342/52 |
| 5,142,290 A * | 8/1992 | DuFort | 342/372 |
| 5,424,737 A * | 6/1995 | Lindell | 342/5 |
| 6,426,814 B1 * | 7/2002 | Berger et al. | 398/45 |
| 6,721,103 B1 * | 4/2004 | Strickland | 359/642 |
| 2003/0043086 A1 * | 3/2003 | Schaffner et al. | 343/909 |
| 2008/0108717 A1 * | 5/2008 | Tokoro et al. | 521/56 |

FOREIGN PATENT DOCUMENTS

JP 10163730 A * 6/1998

* cited by examiner

*Primary Examiner*—Thomas H Tarcza
*Assistant Examiner*—Harry Liu

(57) ABSTRACT

Disclosed is an Radio Frequency (RF) receiving system methodology, utilizing an Luneberg Lens having a spherically shaped outer surface and a semi-spherical shaped focal surface composed of near-equally spaced frequency-independent antenna elements disposed uniformly to cover the semi-spherical focal surface of the Luneberg Lens; and radio frequency (RF) power splitters and combiners for combining the RF energy received by the antenna elements; forming rows and columns; thereby reducing the number of required RF receiver channels for subsequent processing, where the maximum row/column and differential amplitude comparison is used for deriving volumetric direction finding (DF) of intercepted signals; as part of a robust signal detection and direction-finding (DF) system; for detecting and processing a plurality of signals emanating from surface and airborne platforms within the hemisphere, where each surface and airborne platform include transmitters for transmitting navigation, communication and radar signals.

10 Claims, 9 Drawing Sheets

Luneberg Lens

Luneberg Lens

Conformal Array-Feed Structure

Element Decode Table

|  | Column | | | | | | |
|---|---|---|---|---|---|---|---|
| Row | 1 | 2 | 3 | 4 | 5 | 6 | 7 |
| 1 |  |  | 34 | 4 | 11 |  |  |
| 2 |  | 27 | 33 | 3 | 10 | 16 |  |
| 3 | 22 | 26 | 32 | 2 | 9 | 15 | 19 |
| 4 | 21 | 25 | 31 | 1 | 8 | 14 | 18 |
| 5 | 20 | 24 | 30 | 37 | 7 | 13 | 17 |
| 6 |  | 23 | 29 | 36 | 6 | 12 |  |
| 7 |  |  | 28 | 35 | 5 |  |  |

Figure 5

Notional System Design

Feed Element Differential Amplitude for Signal Direction Measurement

| Frequency in GHZ | ***Luneberg*** | | Focal Spot (HP) Beamwidth (degr) | Boresight Minis Adjacent Max Amplitude-Delta to Adjacent Element(dB) | Estimated RF Path Loss | Boresight Net Element Gain | Minimum Adjacent Element Gain | DF Accuracy Using Δ Amplitude |
|---|---|---|---|---|---|---|---|---|
| | Lambda" | Gain(dB) | Lens BW° | | | | | |
| 6 | 1.97 | 16.07 | 31.94 | 62.55 | -2.14 | 4.68 | 11.39 | 9.25 | 0.84 |
| 7 | 1.69 | 17.41 | 27.38 | 53.61 | -2.61 | 4.96 | 12.45 | 9.83 | 0.62 |
| 8 | 1.48 | 18.57 | 23.96 | 46.91 | -3.12 | 5.24 | 13.33 | 10.20 | 0.47 |
| 9 | 1.31 | 19.59 | 21.29 | 41.70 | -3.68 | 5.52 | 14.07 | 10.39 | 0.37 |
| 10 | 1.18 | 20.50 | 19.16 | 37.53 | -4.28 | 5.8 | 14.70 | 10.42 | 0.30 |
| 11 | 1.07 | 21.33 | 17.42 | 34.12 | -4.94 | 6.08 | 15.25 | 10.31 | 0.25 |
| 12 | 0.98 | 22.09 | 15.97 | 31.27 | -5.65 | 6.36 | 15.73 | 10.08 | 0.21 |
| 13 | 0.91 | 22.78 | 14.74 | 28.87 | -6.43 | 6.64 | 16.14 | 9.71 | 0.18 |
| 14 | 0.84 | 23.43 | 13.69 | 26.81 | -7.29 | 6.92 | 16.51 | 9.22 | 0.15 |
| 15 | 0.79 | 24.03 | 12.78 | 25.02 | -8.23 | 7.2 | 16.83 | 8.60 | 0.13 |
| 16 | 0.74 | 24.59 | 11.98 | 23.45 | -9.27 | 7.48 | 17.11 | 7.84 | 0.12 |
| 17 | 0.69 | 25.11 | 11.27 | 22.07 | -10.44 | 7.76 | 17.35 | 6.91 | 0.10 |
| 18 | 0.66 | 25.61 | 10.65 | 20.85 | -11.77 | 8.04 | 17.57 | 5.80 | 0.09 |

Notional System Performance

Figure 8

VOLUMETRIC DIRECTION-FINDING SYSTEM USING A LUNEBERG LENS

CROSS-REFERENCE TO RELATED APPLICATIONS

No prior application claim.

STATEMENT REGARDING FEDERALLY SPONSORED RESEARCH OR DEVELOPMENT

Mr. Roger Dale Oxley is the sole owner with full rights of this invention, developed without any federally sponsored research and development funding or resources.

REFERENCE TO SEQUENCE LISTING, A TABLE, OR A COMPUTER PROGRAM COMPACT DISK APPENDIX

No separate materials listing, tables or computer program CD was submitted.

BACKGROUND OF THE INVENTION

1. Technical Field

The RF spectrum is increasingly dense and complex, with expanding introduction of commercial, civil and military emissions, which places extreme demands on the reconnaissance, surveillance and early-warning equipment and missions. The modern weapons and delivery systems have also evolved to be increasingly silent and stealthy, with supersonic/hypersonic delivery speeds, placing naval platforms at high risk. As a result, the need for simultaneous wide-instantaneous-bandwidth, high sensitivity and precision direction-finding is paramount to military success.

Similarly, reconnaissance and surveillance activities need instantaneous-bandwidth, high sensitivity and precision direction finding to overcome scan-on-scan-on-scan (antenna on antenna on frequency) issues, for detecting and analyzing signals-of-interest in the modern crowded environments. This invention is a volumetric Radio Frequency (RF) receiving system, utilizing a Luneberg Lens for high-gain multi-beam contribution, a frequency independent feed structure to insure reception and processed to provide precision direction-finding of RF signals, emanating from navigation, radars and communication equipment on surface and airborne platforms. Such a system may be utilized for situation awareness, threat detection and warning, and may be used for cueing combat weapon and/or electronic attack systems. Further, such a system may be used on satellite, naval surface platforms, tactical aircraft and/or mobile/fixed land sites.

2. Prior Art

Modern signal detection and direction-finding techniques utilized multiple dispersed antenna/receiver channels to form vertical and horizontal baselines, per quadrant and use differential antenna/receiver phase, amplitude or time for estimating signal direction, or direction finding. As an example, to provide near hemispheric direction finding, the modern day system utilizes multiple-baseline multiple-quadrant linear interferometers, where each linear interferometer only provide a useful field-of-view of typically 90 degrees in either azimuth or elevation. Therefore, two linear-interferometer baselines are required per quadrant, one for azimuth and one for elevation, where each interferometer is composed of multiple phase-matched and/or calibrated element/receiver channels.

As the emitter approaches the collection system, the elevation angle increases and can approach the apex, where all DF information is severely compromised if not lost (commonly referred to as the donut pattern, caused by shortening of the electrical-length of the antenna baseline as a function of COS ($\theta_{el}$) where $\theta_{el}$ is the elevation angle. Further, interferometry requires use of wide field-of-view antenna elements, sufficiently wide for instantaneous quadrant field-of-view, which severely limits antenna gain to on-the-order of 0 to 6 dB, which directly impacts system sensitivity; and provides virtually no spatial filtering for signal discrimination and interference mitigation.

The typical two dimensional interferometer system can be composed of 5 antenna/receivers for azimuth, another 5 antenna/receivers for elevation, times 4 quadrants, which can add up to 40 or more antenna/receivers, with each channel requiring complex detection and measurement processing. For these reasons a near hemispheric direction-finding system can be very large, expensive, require substantial complex processing and plagued with maintenance/calibration issues. This disclosure will provide the requisite performance while substantially reducing the required RF channels, size and cost as compared with these prior art systems.

Some available publications describing the prior art includes:

(1) R. L. Goodwin, "Ambiguity-Resistant Three- and Four-Channel Interferometer," Naval Research Laboratory Report, September 1976. pp all.

(2) Roger D. Oxley, "Ambiguity-High-Resolution, Six-Channel Interferometer Development and Performance," Naval Research Laboratory Report, September 1976. pp all.

(3) James Bao-Yen Tsui, "Microwave Receivers With Electronic Warfare Applications," Krieger Publishing Company, Malabar, Fla. pp 1-4, 93-111.

BRIEF SUMMARY OF THE INVENTION

Substance

This invention utilizes a single multi-beam antenna aperture that offers instantaneous wide RF bandwidth, hemispheric volume coverage, and beam-forming for high gain—high sensitivity, for signal detection and precision direction-finding (DF). This antenna system incorporates a spherical lens, with the lens focal surface near-uniformly covered with a spherical array of frequency-independent (broadband) receiving elements as the antenna feed. Thus, near hemispherical interception of plane-waves emanating from any direction within the hemispheric volume, where impinging wave-front will focus on one or overlap two elements within the spherical shaped feed structure. By recovering the illuminated or overlapped elements permit estimating the arriving 2-dimensional direction with high precision.

The near-uniformly spaced frequency-independent elements on the conformal design semi-spherically shaped array feed are each split and combined to form near orthogonal rows and columns, plus a single all-summed (all elements) output to provide an hemispheric Omni directional broadband capability for high-probability of intercept. Forming rows/columns drastically reduces the number of required RF channels while preserve the directional information for estimating precision DF.

In summary, simultaneous multiple-beam high reception antenna-gain is provided by the lens over the entire hemispheric field-of-view volume, all-summed channel provides 100% probability of intercept, and columns/rows dramatically reduce the required number of RF channels, which reduces cost, size and complexity.

To put this in prospective, detection sensitivity as compared with prior art can be increased by a 100 fold; volume coverage and wide frequency bandwidth can provide 100% probability of intercept, which is rarely affordable with prior art; fractional-degree direction finding accuracy can easily match or exceed prior art, and the required RF paths, as compared with prior art can be substantially reduced from typically 40 by a factor of two or more.

This invention may be used in a wide variety of applications, including commercial, civil and military, to provide high sensitivity, high probability of intercept, precision DF measurement for situation awareness and threat warning.

OBJECT OF THE INVENTION

There is a need for a system which can provide near hemispheric volume coverage with antenna gain and signal direction-finding measurement. The primary objective of the invention is developing a means for performing radio frequency (RF) precision direction finding (DF) of multiple simultaneous signals dispersed over a near hemispheric spatial volume and extended frequency bandwidth. Furthermore, the goal is to overcome the prior-art limitations of requiring large numbers of antenna subsystems dispersed over multiple linear baselines, RF channels and quadrants to achieve comparable coverage.

Most operational platforms, particularly naval and air platforms, have limited real-estate for antenna subsystems. Therefore, the motivation to reduce the required size and weight of a hemispheric-volumetric signal interception system, without performance tradeoff, to afford more favorable installation options for greater height on the ships mast to extend the horizon with reduced obstructions.

BRIEF DESCRIPTION OF THE SEVERAL VIEWS OF THE DRAWING

FIG. 5 shows the notional 7×7 arrangement of columns and rows showing the corresponding elements numbered in the table, which later forms the basis for recovering the original illuminated elements;

FIG. 8 is a table containing directional (DF) performance accuracy versus frequency, derived from modeling the notional system design, based on the 7 by 7 (rows/columns) system design.

DETAILED DESCRIPTION OF THE INVENTION

Figure 1:
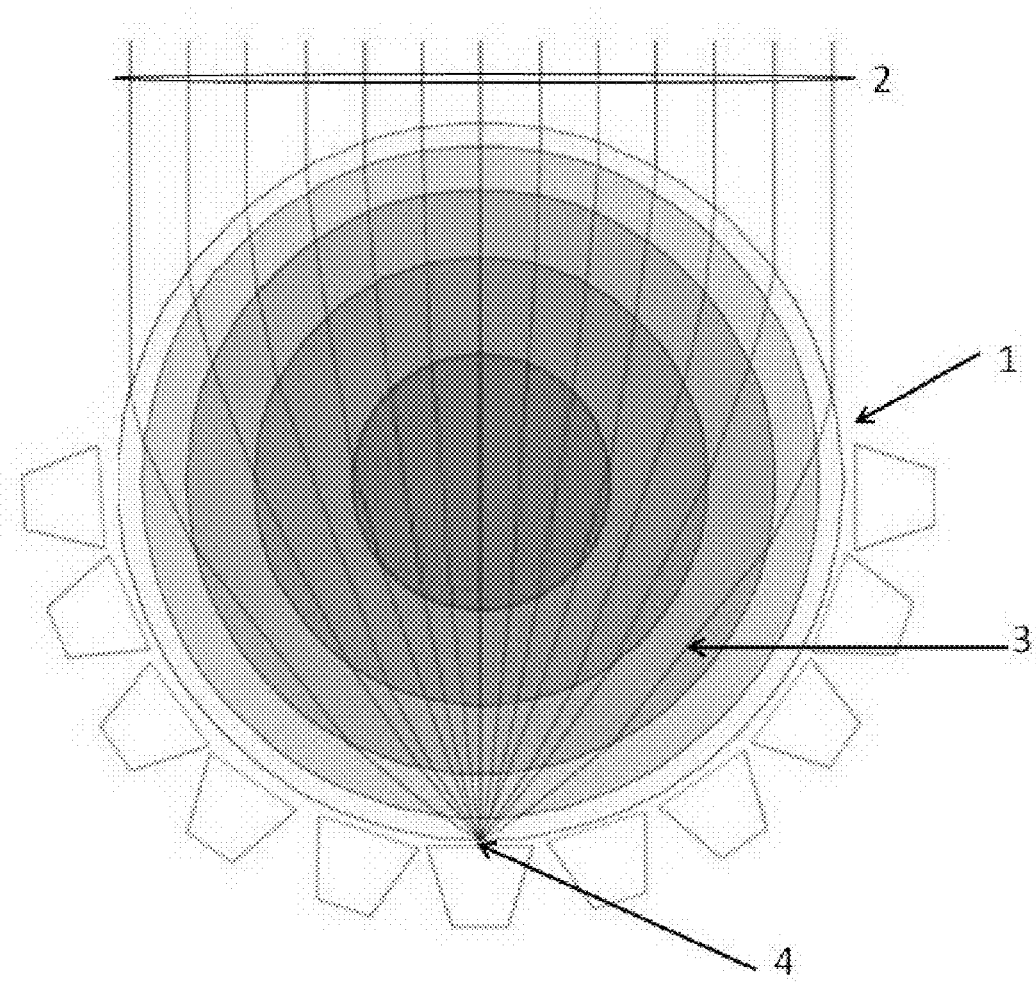
FIG. 1 is an example of the Luneberg Lens, where beam forming produced by the gradient diffractive interior, shown as concentric layers in the one-dimensional cut-away view; plus the multi-element feed-structure surrounds the lower half of the Lens.

The RF spectrum of today is increasingly dense with the rapid introduction of commercial, civil and military emissions, which has placed extreme demands on military situation awareness and early-warning equipment and missions. The modern weapon and delivery systems have evolved to be silent and stealthy, and weapons are able to cruise at supersonic/hypersonic speeds. Many of these threats employ low-probability-of-intercept (LPI) technology to further evade detection. Similarly, reconnaissance and surveillance activities are hampered, lacking bandwidth, high sensitivity systems with direction finding; to address complex scan-on-scan issues. Detecting and analyzing signals of special interest is increasingly difficult.

Addressing these operation issues require system architectures which can instantaneously look in all hemispheric directions while monitoring the full frequency coverage (typically several GHz), have considerable antenna gain (on the order of 100:1 or better) for sensitivity, and precision signal direction measurement (sub one degree). For those skilled in this technology sector, will readily recognize this as somewhat contradictory requirements and extremely challenging to accomplish. Antenna gain/high sensitivity implies narrow antenna beam-width, or otherwise high processing gain. Certainly it's possible to configure a host of narrow-beam antennas dispersed spherically and provide requisite volumetric gain, but the number of antennas and receivers become extremely large in number.

This invention can address all of these operational issues, by providing instantaneous hemispheric coverage for broad frequency bandwidths, using a multi-beam (multiple simultaneous signals) lens where signal energy is focused (to provide high gain) on a frequency-independent semi-spherical array feed-structure; where the feed elements are split and combined in a novel manner that significantly minimizes the number of RF channels and subsequent receivers. The element summing is accomplished in a manner that retains traceability back to the original focal point elements, and provides differential-amplitude information for fine (precision) direction finding. With this implementation, the required number of RF channels and subsequent receivers, is typically reduced by a factor of 2 or more, as compared with the total number of.

The Luneberg Lens has been extensively studied internationally and is commonly used for specialized applications such as retro-directing RF energy for jamming or electronic attack (EA), where the goal is to receive the radar emitted energy and retro-direct (transmit) the energy back to the emitting radar, for countermeasures purposes. For countermeasures application the back side of the lens is typically covered with an RF reflective surface, or a feed structure is incorporated composed typically of horn or patch-antennas.

Similarly, the lens has been used for satellite tracking where either the reflective surface or an a patch-antenna array functions as the feed to maintaining tracking of satellites. In all of these applications, the actual signal direction is inconsequential with no necessity to measure the direction. Further, these applications using multi-element feed structure are relatively narrow-band and may use horn or patch elements to form the feed structure, and typically limited to less than a 2:1 operational bandwidth.

For this invention, a multifold solution is disclosed to address deficiencies of current art direction-finding systems. First, a relatively simple antenna and feed assembly, using the Luneberg Lens is disclosed. The lens shown in FIG. 1 is composed of a non-homogenous medium with a graded index of material with a radial index of refraction variation (from a unit radius lens) of:

$$n(r)=(2-r^2)^{1/2}$$

where n(r) is the index of refraction of the spherical RF lens at a radial distance r from its center. A smooth variation of index of refraction from the radius is very difficult to achieve, but a step-wise hemispherical shell construction has proven to be very successful by several vendors. Rosedal Associates, located in Sante California produces a product line of lens antennas with a variety of sized and characteristics. Another vendor offering a product line of lens antennas is Lun'tech located in France. The operation of the lens 1 is best understood by tracing the RF ray path as the lens receives RF energy from an incoming plane wave 2 and migrates through the core of the lens. The index of refraction is graded in such a way as to cause the impinging ray 3 to bend and focus 4 at a finite location on the opposite side of the lens.

Figure 2:
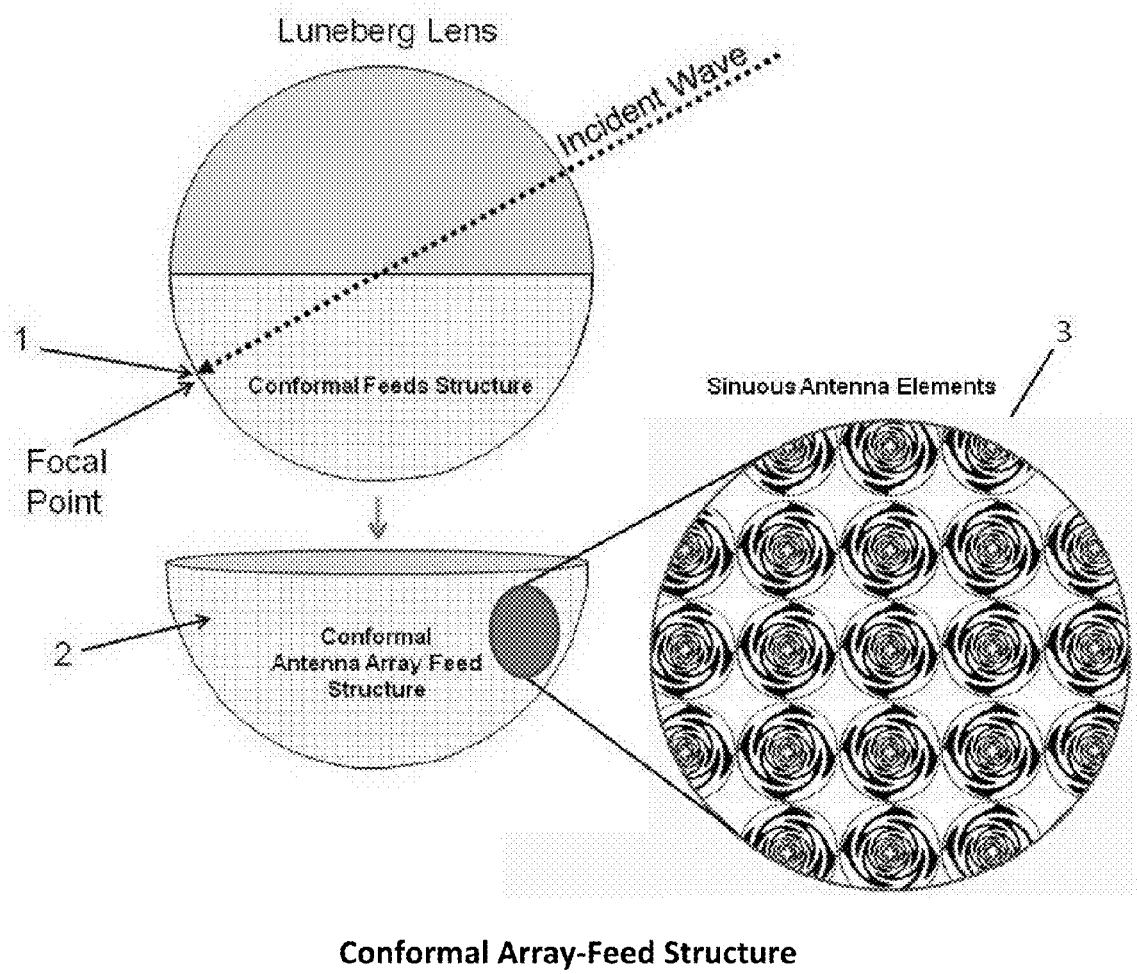
FIG. 2 shows an incident RF plane wave impinging on the Luneberg lens, and beam focused on the conformal feed structure, composed of near equally-spaced frequency-independent such as the Sinuous antenna.

The lens with the conformal Array Feed structure is shown in FIG. 2 incorporating an array 2 of frequency-independent planar sinuous elements 3 (or other planar spiral), approximately uniformly displaced over the semi-spherical surface conforming to the shape of the lens. For surface platform applications, the array feed structure will cover the lower half of the lens, with the upper half of the lens unobstructed for signal interception. Plane-waves arriving at the lens are focused 1 to illuminate one or more elements on the semi-spherical shaped feed structure.

The feed element spacing is matched to the lens focal-point spot-size for the systems highest operating frequency, such that when the lens focal-point spot is exactly centered on a single elements, the power level at the closest element is approximately 10 dB down from the focal-point spot power. Of course numerous other spacing to power relationships can be chosen based on application objectives. The choice of 10 dB is partially for illustration purposes, but also based on previous experience, which favors using this value to accommodate widening spot-size for lower frequencies, constraining antenna-gain loss, and when the focal-point spot is centered exactly between two elements, the received power level of both elements are equal and 3 dB down from the spot power level.

This geometry will assure that a useful differential amplitude condition between adjacent feed elements will exist to support fine direction-finding measurement, which will be further developed and described later. Mutual coupling between feed elements can be a limiting factor particularly if chosen spacing is less than $\lambda/2$. Also, constructing the feed array using planar antenna elements such as the spirals or sinuous exhibit broad bi-directional beams (toward the lens and reverse direction) needing a layer of RF absorber material applied to the reverse side of the feed-structure. Also, it should be pointed out that the feed element is extremely broad beam (approximately 60 degrees of greater) as compared with the lens focus-point beam.

To further define the feed element spacing, we must define the lens focal-point spot-width, which will influence the selected feed-element spacing. Diffraction theory defines the minimum focal-point spot-radius ($r_A$) for the lens aperture of diameter D is equal to:

$$r_A = 1.22(f\lambda/D)$$

where D is the diameter of the spherical Luneberg lens; f is the focal length of the lens (from the center of the of the sphere to the focal point); and $\lambda$ is the free space wavelength for the design frequency (highest frequency of operation). Therefore, the width of the focal-point spot-width is simply $r_A$ times 2 and the spot-width expressed in degrees is $180(2 r_A/(\pi D/2))$.

Figure 3:
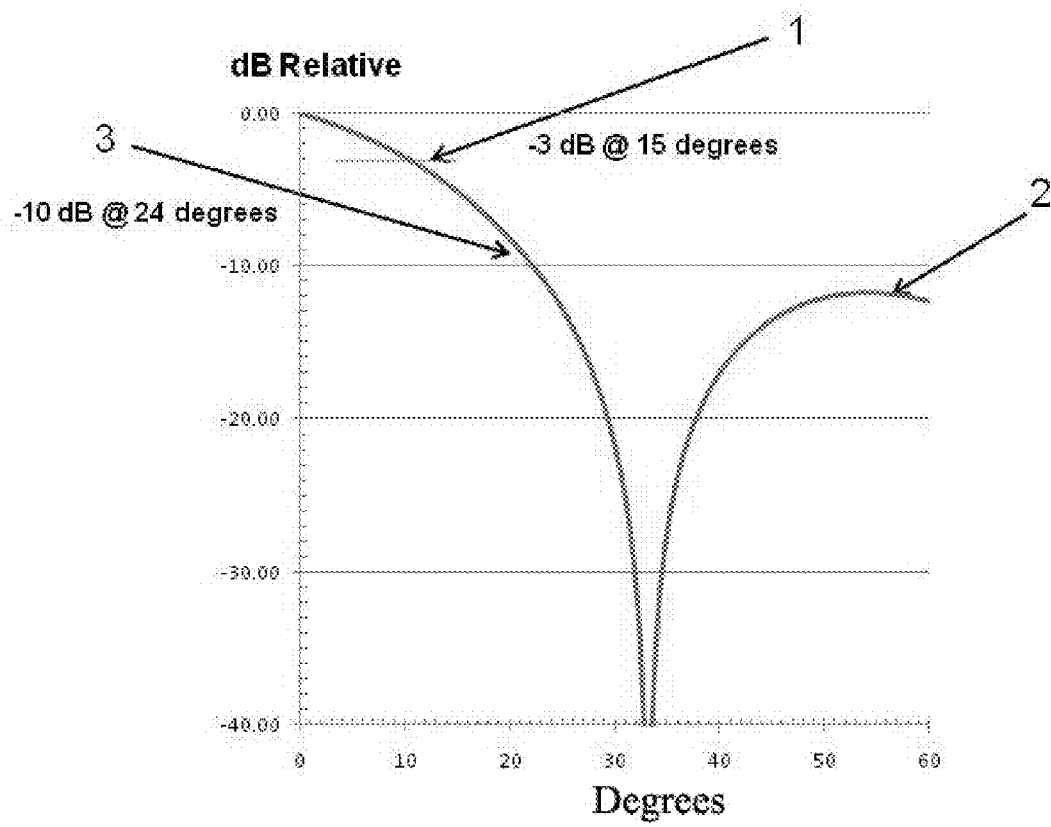
FIG. 3 depicts the Luneberg Lens focus point beam-shape pattern versus radial angle relative to the center of the Luneberg Lens, at 18 GHz.

An example antenna is comprised of a 112 mm (4.4") diameter lens, with the design frequency of 18.0 GHz, provides 25.6 dB gain, with a half-power (−3 dB) beam-width (HPBW$_{-3}$) of 10.7 degrees. FIG. 3 shows the focal-point spot beam-pattern 1 (not to be confused with the lens beam-width HPBW$_{-3}$); where the focal-point spot is shown exactly centered on a single element (centered at 0 degrees) with the adjacent element to be located at approximately the −10 dB point 2 on the focal-point beam pattern. For this example lens, solving the focal-point radial spot-width (at −3 dB) in inches is given by:

$$r_A = 1.22(f\lambda/D)$$

where f is focal length of 4.4/2 and $\lambda$ is 39.37(299.792/18000) for 18 GHz design frequency and D of 4.4, gives radius $r_A$ equal to 0.4 inches. Also, expressed in degrees is $180(2 r_A/(\pi D/2))$ which gives $(\theta_2 r_A) = 20.84$ degrees.

Figure 4A:
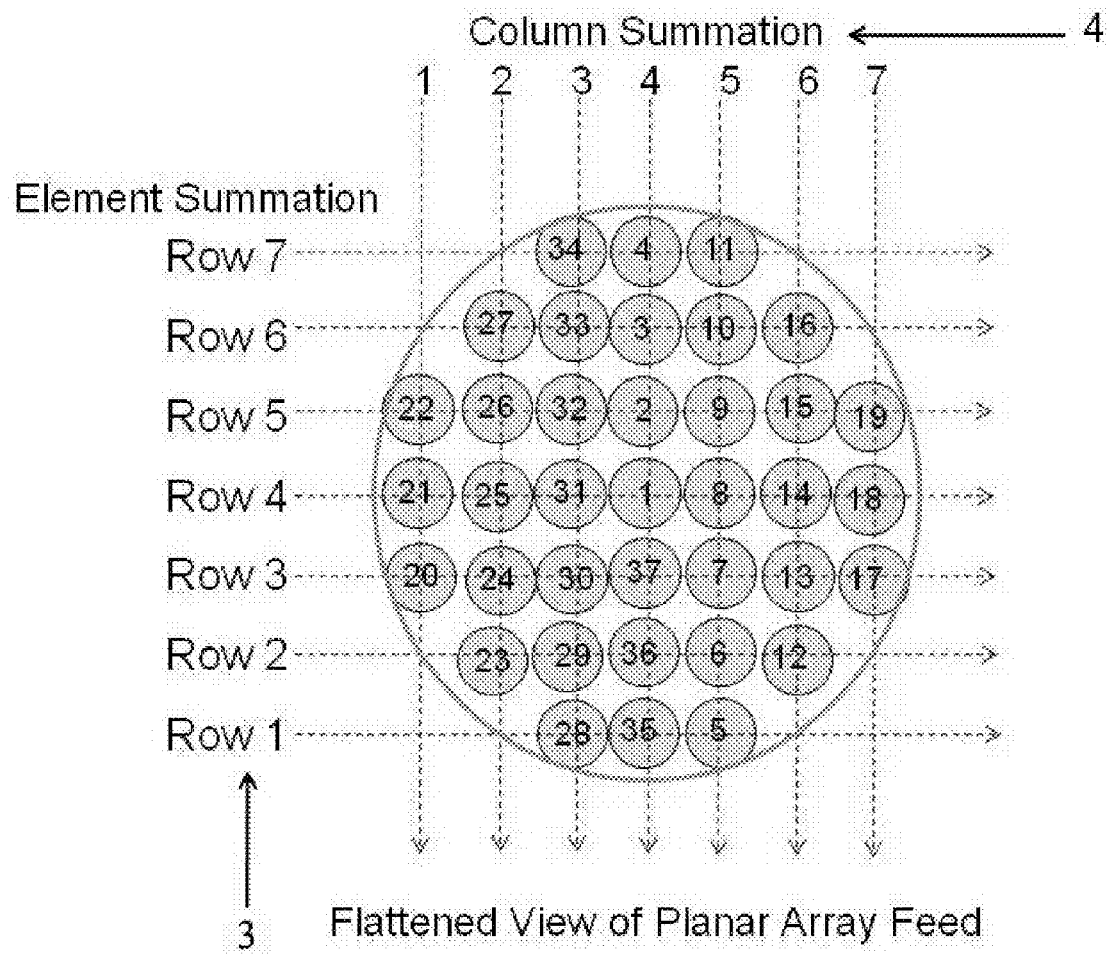
FIG. 4a is a flattened view of a notional semi-spherical conformal array feed composed of 37 elements, showing element spacing and numbering.

The number of required equally spaced elements to cover a half-spherical area, configured in rows and columns, can be estimated by:

$$N = |2\lambda(D^2/4)/\pi r^2_A|$$

which equals approximately 30 for this example design. This formula works reasonably well for large population of elements, where the number of elements overlaying the spherical edge is a small percentage of the total. For this example having intentionally few elements, I chose to leave elements slightly overlaying the spherical boundary as opposed to risk not having full hemispheric coverage. For illustration the flattened view of the semi-spherical feed structure is shown in FIG. 4a which contains 37 elements as opposed to the calculated 30. Though 37 elements are not particularly large numbers, the desire is to reduce the down-stream RF Receivers needed to extract the signal information, to the extent possible.

Figure 4B:
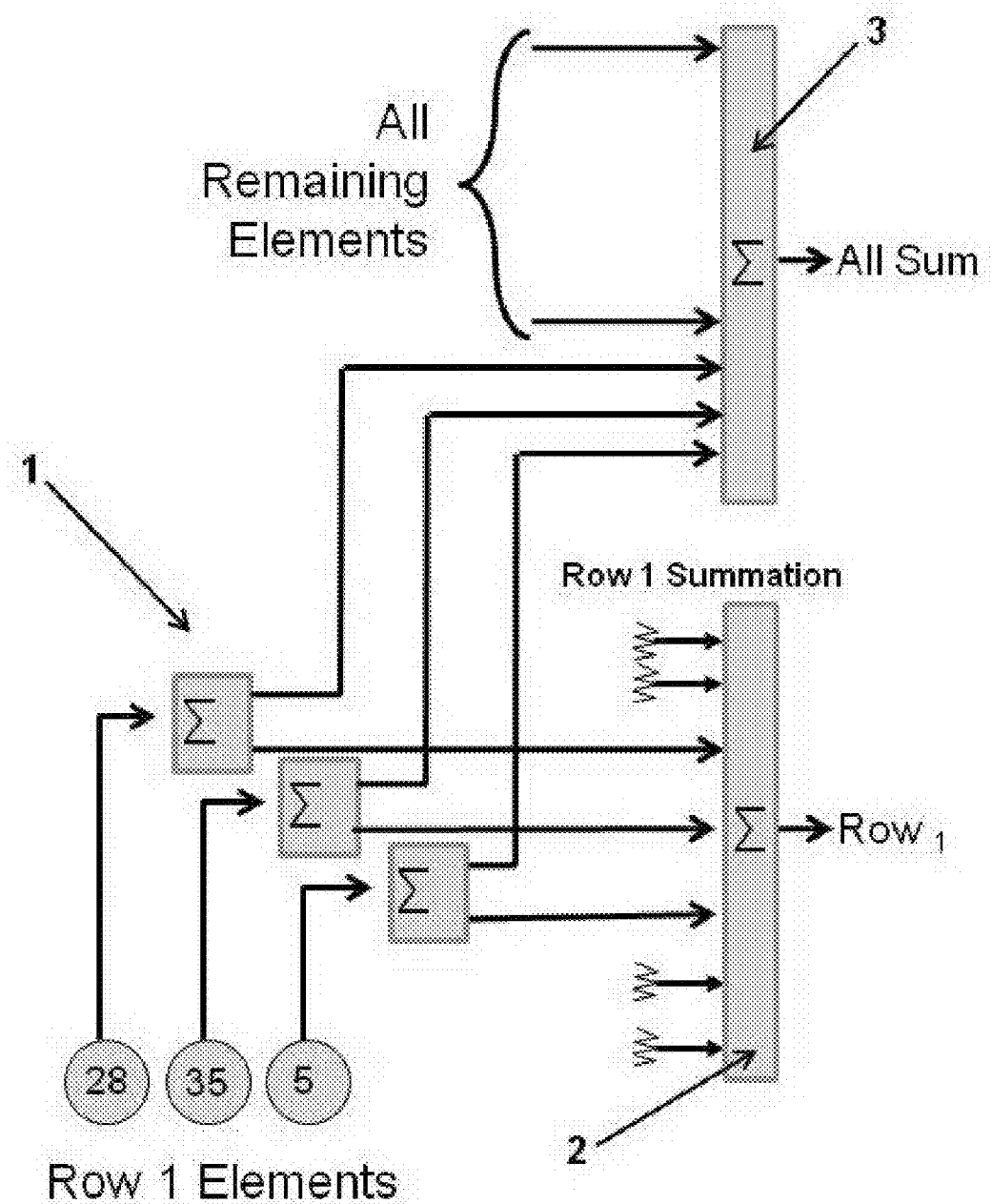
FIG. 4b shows the notional design RF splitting of each element, followed by summing to create columns, rows and all-sum outputs.

This is accomplished as depicted in FIG. 4a by creating columns 4 and rows 3. This is further described with FIG. 4b where each element is power divided 1 creating two paths for each element. The first path is 2 is summed to create Rows and Columns. The second path from each element is summed 3 to create an All Sum channel. For this example, split and summing provides 7 Rows, 7 Columns and a single All Sum, for a total of 15 RF outputs. Through split/summing the 37 discrete elements are reduces to 15 channels. FIG. 5 shows the row/column segmentations, where the intersection of any Row and Column identifies the elements illuminated by the lens.

Figure 6:
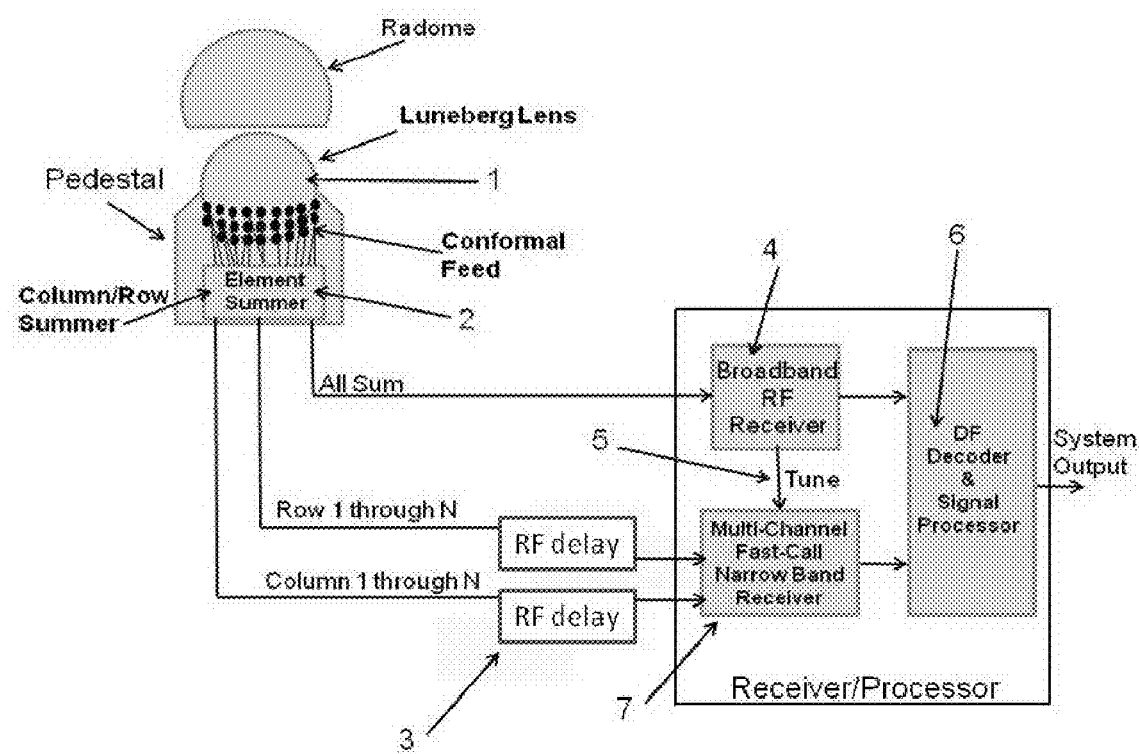
FIG. 6 is a block diagram of the notional system using the all sum channel as an activity detector, cueing the fast-call DF receivers for processing of the delayed row/column channels for signal characterization and signal direction determination.

With the Antenna subsystem described, the second solution is further disclosed. As shown in FIG. 6, the Row/Column and All-Sum outputs 3 are passed from the antenna subsystem and interfaced over coax, waveguide or RF over fiber or other interface media to the Receiver/Processor subsystem potentially located in an enclosed space or below-deck in the case of a naval vessel or other platforms, for final processing. The All Sum 3 carries the full frequency bandwidth and hemispheric volume where full signal activity can be observed, without knowledge of the originating element.

The All Sum channel will typically be monitored by the Broadband Activity Receiver 4 for signal detection. Activity receiver will typically be a broadband digital or analog channelizer, an Instantaneous Frequency Measurement (IFM) or wideband logarithmic amplifier/detector or other suitable high-probability-of-intercept receiver. When signal detection occur the Broadband Activity Receiver rapidly measures frequency and initiates tuning of the Multiple Fast-Call Narrow-Band receivers (and may measure other signal parametric attributes such as detection time, amplitude, rise-time, modulation and pulse-width).

Following being tuned, 5 the Multiple-Channel Fast-Call Narrowband Receiver 7 performs signal detection for all 7 Rows and & Columns, measuring signal power-level (hereafter referred to as amplitude data) and potentially other pertinent signal parametric information. Signal detection is expected in at least one row and one column to be 3 a valid measurement. Both the Broadband Activity and the Multi-Channel receivers may contribute measurement data to the DF Decoder and Signal Processor 6.

The RF Delay 3 provide sufficient time-delay of RF signals contained in Rows and Columns to allow time for the Broadband Activity Receiver to detect, measure the signal frequency, and tune the Multi-Channel Fast-Call Narrow Band Receiver. Further, if RF over Fiber is used to interface between the Antenna and Receiver/Processor subsystems, the needed RF Delay can be accomplished merely by excess length in fiber in the Multi-Channel Fast-Call Receiver path.

Figure 7:
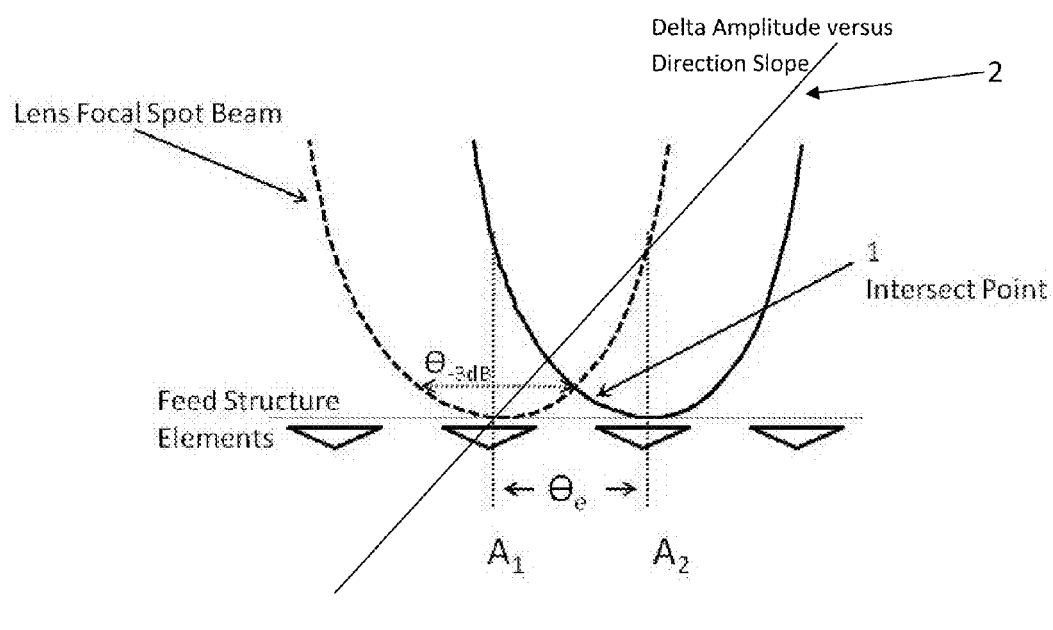
FIG. 7 depict the Luneberg lens focal-spot beam pattern as it relates to an optimal feed structure element-spacing, showing the adjacent feed-element amplitude-difference caused by the focal-spot beam pattern, later used for signal direction estimation.

The DF Decoder & Signal Processor 6 receives the measurement data to include Amplitude for each active row and column provided by the Multi-Channel Fast-Call 7 Receivers. The DF Decoder & Signal Processor 6 identifies the maximum adjacent pair signal Amplitudes 1 from Rows and Columns measurement data. Using the Amplitude data as shown in FIG. 7 the highest adjacent pair in both row and column is identified. These highest adjacent pairs are subtracted to create differential-amplitude measurement, having a magnitude versus frequency slope, 2 appropriately scaled by frequency (correct for lens-focal point changes with operating frequency, etc.).

Both (row and column) differential amplitude measurements, and identified highest row and column are used by the DF processor to calculate the estimated bearing for both azimuth and elevation. The highest identified row and column provide the first-order bearing measurement and the corresponding differential amplitude measurements are then applied for fine correction.

The described first-order bearing and fine correction process, using the identified highest row/column and differential amplitude data, can be potentially processed through a variety of means other than that described, potentially by direct table lookup, algorithmic conversion and use of kinematic tracker algorithms to improve tracking accuracy for signals traversing the volume.

Numerous other variations can be adapted for this invention, such as processing the Row/Column channels directly eliminating the RF Delay and Wideband Activity Receiver. Another option is to use tune step-and-dwell of Row/Column Narrow Band Receivers, time-sharing a limited number of Receivers, and avoid the need for RF Delay and Wideband Activity receivers. Further, each row and column 1 to N could have an incremental increase in RF Delays, where the incremental value exceeds the required time-time of the Multi-Channel Fast-Call Receivers. Such an implementation would allow am N-position switch to cycle through the incremental RF Delay and process all Rows/Columns with a single Narrow Band Fast-Call receiver.

The notional design describes in this disclosure was modeled as an 7×7 Row/Column receiver system, utilizing the 4.4 inch Luneberg Lens, with the Sinuous semi-spherical feed structure. FIG. 8 shows the summary performance covering 6 to 18 GHz 1 and Directional Accuracies 2 ranging from 0.09 to 0.84 degrees rms. Though not specifically stated elsewhere, the sinuous antenna elements, used in the lens feed, can be dual polarization elements to support signal polarization measurement. This can be accomplished through switching between orthogonal polarizations or simultaneous processing of both polarizations without switching.

Having described the invention in detail, the following claims are made:

1. An Broadband Volumetric Direction-Finding System comprising of a Luneberg Lens having a spherically shaped outer surface and a hemi-spherically shaped focal surface composed of near equally-spaced frequency-independent elements such as the Equiangular Spiral, Planar Spiral, or sinuous disposed along the focal surface of the Lens to function as the array feed.

2. The system as claimed in claim 1 wherein the feed-array of near equally spaced frequency independent antenna elements are spaced such that the impinging signal plane-wave focused on an individual element, will also illuminate its adjacent elements with reduced RF power level such that the signal power level (amplitude) difference (differential amplitude) provides a means for estimating the signal's direction as it migrates from one element to the next.

3. The system as claimed in claim 2 wherein the feed-array of near equally spaced frequency independent antenna elements are individually RF power-divided (split) and subsequently combined to create near orthogonal and plurality rows and columns; plus all elements are combining to create an all element sum outputs.

4. The system as claimed in claim 3 wherein the near orthogonal and plurality rows and columns are RF outputs contain encoded signal direction information; where the number of rows plus the number of columns are less than the number of total elements.

5. The system as claimed in claim 2 wherein the rows and columns are time-delayed through any means to allow time for RF receivers to detect the presence of signals using the all-sum RF output, and cue Fast-Tune receivers to process said signals, propagating through the delayed rows and columns.

6. The system as claimed in claim 5 wherein each row and column is time-delayed through any means to allow sequential switching or processing through the rows and columns using fewer receivers than the total number of rows and columns.

7. The system as claimed in claim 2 wherein the processed rows and columns are used for detecting the presence of a signals and identifying their maximum adjacent pairs of intersecting rows and columns; based on RF power level (signal amplitude).

8. The system as claimed in claim 6 wherein the identified maximum intersecting adjacent pairs of rows and columns; based on RF power level (signal amplitude), are used in determining the feed elements and hence arriving direction of the signal.

9. The system as claimed in claim 7 wherein the identified maximum intersecting adjacent pairs of rows and columns; based on RF power level (signal amplitude), are used to form differential amplitude information for refining the signal direction measurement, and/or maintaining the signals directional measurement at it traverses element-to-element across the lens feed.

10. The system as claimed in claim 1 wherein the Broadband Volumetric Direction-Finding System comprising of a Luneberg Lens and the frequency-independent array feed-structure, provides spatial filtering through beam forming, thereby mitigating multiple signal contention and/or destructive interference.

* * * * *